(12) United States Patent
Chao et al.

(10) Patent No.: US 6,785,197 B2
(45) Date of Patent: Aug. 31, 2004

(54) CONTROL SYSTEM AND METHOD FOR CONTROLLING THE SLED OF THE OPTICAL STORAGE DEVICE BY USING STEPPING MOTOR

(75) Inventors: Chi-Mou Chao, Hsinchu (TW); Chih-Yu Fan, Hsinchu (TW); Jan-Tang Wu, Hsinchu (TW)

(73) Assignee: Acer Laboratories, Inc., Taipei Hsien (TW)

( * ) Notice: Subject to any disclaimer, the term of this patent is extended or adjusted under 35 U.S.C. 154(b) by 607 days.

(21) Appl. No.: 09/931,944

(22) Filed: Aug. 20, 2001

(65) Prior Publication Data

US 2002/0101792 A1 Aug. 1, 2002

(30) Foreign Application Priority Data

Jan. 29, 2001 (TW) ........................................ 90101600 A (51) Int. Cl.[7] ................................................ G11B 7/00
(52) U.S. Cl. .............................. 369/30.15; 369/30.13; 369/53.3
(58) Field of Search ........................... 369/30.13, 30.15, 369/215, 44.28, 44.27, 44.29, 53.22, 53.41, 53.45, 47.1, 53.3, 53.37, 47.38, 53.24, 53.34, 47.17, 59.21, 47.5, 116, 53.31, 30.17, 30.1, 30.11, 13.32, 53.38, 53.39

(56) References Cited

U.S. PATENT DOCUMENTS 5,737,289 A * 4/1998 Udagawa .................... 369/47.5
6,341,103 B1 * 1/2002 Takeda et al. ........... 369/30.15
6,414,925 B2 * 7/2002 Andoh ..................... 369/53.24

* cited by examiner

*Primary Examiner*—Ali Neyzari
(74) *Attorney, Agent, or Firm*—Bacon & Thomas PLLC (57) ABSTRACT

A control system and method for controlling a sled of an optical storage device by using a stepping motor. The optical storage device includes a pick-up head having a lens and a sled. The control system includes a tracking actuator's controller used to receive a tracking signal TE for generating a tracking control signal TRO to control positions of the lens; a numerical controller connected with the tracking actuator's controller used to receive the tracking control signal TRO for generating a numerical control signal; a frequency converter connected with the numerical controller used to receive the numerical control signal for generating a pulse flag signal and a direction flag signal; and a ring generator connected with the frequency converter used to receive the pulse and direction flag signal for producing a sled control signal to drive the stepping motor for controlling the sled.

58 Claims, 9 Drawing Sheets

CONTROL SYSTEM AND METHOD FOR CONTROLLING THE SLED OF THE OPTICAL STORAGE DEVICE BY USING STEPPING MOTOR

REFERENCE TO RELATED APPLICATION

The present application claims priority to Taiwan application No. 09 01016 00, entitled "Control System and Method for Controlling the Sled of the Optical Storage Device by Using Stepping Motor," filed on Jan. 29, 2001.

BACKGROUND OF THE INVENTION (1) Field of the Invention

The invention relates to a control system and a related control method for an optical storage device, and more particularly to the control system and the control method which utilize a stepping motor to control a sled of the optical storage device.

(2) Description of the Prior Art

Recently, due to rapid development upon the semiconductor technology and the photoelectric technology, related photoelectric apparatus and products has become standard and required peripherals of the computer system. For example, an optical storage device is one of those popular apparatus. Regarding the optical storage device, various related products including a CD-ROM, a CD-R, a CD-R/W and a DVD can be seen in the market and are already widely accepted. For the optical storage device and the related products such as the CD-ROM, the CD-R, the CD-R/W and the DVD, it is highly demanding to achieve quality requirement upon operation speed and data reading/writing. Thus, the stability during high-speed operation and the ability of accurate data-retrieving become crucially important to the control of the sled of the optical storage device.

Regarding the method for controlling the sled of the optical storage device, control of the motor is particularly important. In the market, the motor can be a stepping motor or a DC motor. Compared with the DC motor, the stepping motor has a simpler and lower-cost driving mechanism and has the advantage upon circuitry design of the photo detection feedback and the magnetic detection feedback. Therefore, the stepping motor, replacing the DC motor, becomes more and more popularly as a sled control means for the optical storage device.

Figure 1:
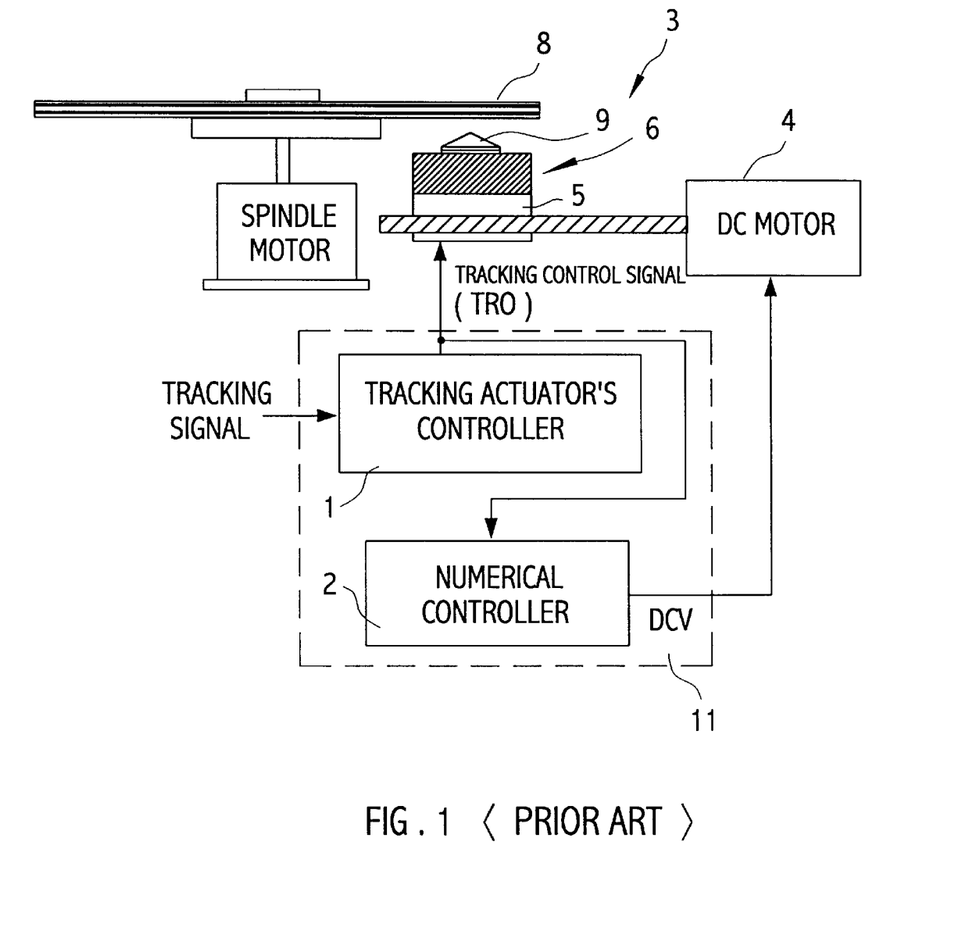
FIG. 1 is a schematic block diagram to show the signal flow for driving a sled in the art.

Referring now to FIG. 1, a control system 11 of an optical storage device 3 in the art is shown schematically. The optical storage device 3 includes a pick-up head 6, a DC motor 4 and the control system 11. The pick-up head 6 further includes a lens 9 and a sled 5. The control system 11 further includes a tracking actuator's controller 1 and a numerical controller 2. While the pick-up head 6 is moved to retrieve data from a disk 8, the optical storage device 3 can generate a respective tracking signal. The tracking signal is then forwarded to the tracking actuator's controller 1 for further generating a tracking control signal TRO for controlling the position of the lens 9 of the pick-up head 6. The TRO is then sent to the numerical controller 2 for forming a numerical control signal DCV for driving the DC motor 4. The DC motor 4 in accordance with the DCV is utilized to drive the sled 5 of the pick-up head 6. Nevertheless, aforesaid art is not suitable to proceed the operation of a high-speed track seek. Due to uneven friction distribution along the track of the sled, difficulty in mass production has already been seen.

SUMMARY OF THE INVENTION

Accordingly, it is a primary object of the present invention to provide a control system and a method for controlling the sled of the optical storage device by using stepping motor which can provide a better solution to the aforesaid disadvantage in the art.

In accordance with the present invention, the optical storage device applies the control system to perform the method for controlling the sled. The control system includes a tracking actuator's controller, a numerical controller, a frequency converter, and a ring generator. The tracking actuator's controller is used to receive a tracking signal TE. The tracking signal TE is then used to generate a tracking control signal TRO for controlling positions of a lens of a pick-up head of the optical storage device. The numerical controller connected with the tracking actuator's controller is used to receive the tracking control signal TRO and further to generate a respective numerical control signal. The frequency converter connected with the numerical controller is used to receive the numerical control signal and further to generate a respective pulse flag signal and a respective direction flag signal. The ring generator connected with the frequency converter is used to receive both the pulse flag signal and the direction flag signal and further to produce a sled control signal. The sled control signal is then used to drive the stepping motor of the optical storage device for controlling the sled of the optical storage device.

All these objects are achieved by the control system and the method for controlling the sled of the optical storage device by using stepping motor described below.

These and other objectives of the present invention will no doubt become obvious to those of ordinary skill in the art after having read the following detailed description of the preferred embodiment, which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a control system and a control method for controlling the sled of the optical storage device by using stepping motor. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2:
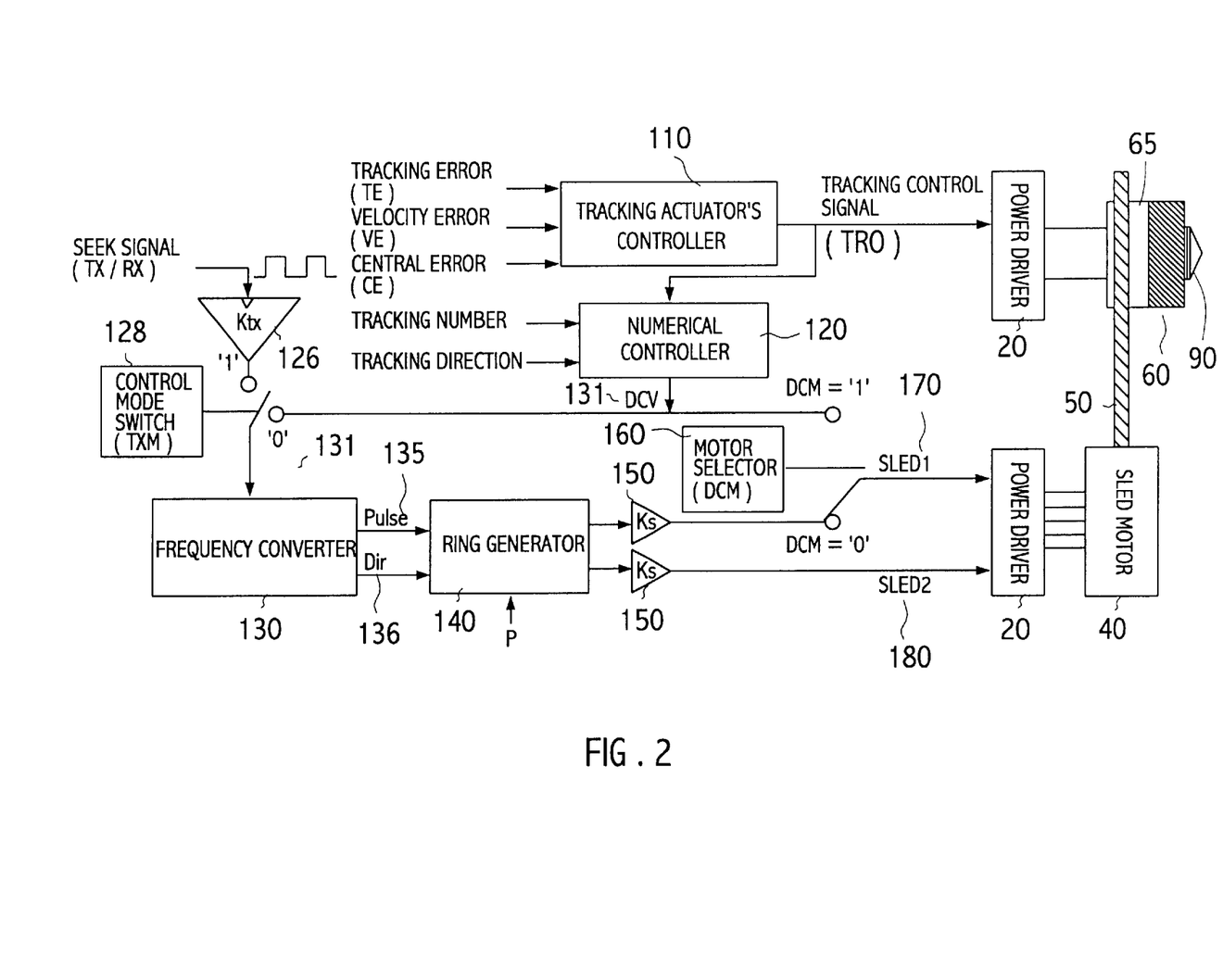
FIG. 2 is a block diagram of a preferred control system for controlling the sled of the optical storage device by using stepping motor in accordance with the present invention.

Referring now to FIG. 2, a preferred embodiment of the present invention is shown in a block diagram. The control system includes a tracking actuator's controller 110, a numerical controller 120, a frequency converter 130, and a ring generator 140. The tracking actuator's controller 110 is used to receive a tracking signal (TE) and thereby to further generate a tracking control signal (TRO) for controlling positions of the lens 90 inside the pick-up head 60. The numerical controller 120 connected with the tracking actuator's controller 110 is used to receive the tracking control signal (TRO) for further generating a respective numerical control signal (DCV) 131. The frequency converter 130 connected with the numerical controller 120 is used to receive the numerical control signal (DCV) 131 for further generating a respective pulse flag signal (Pulse) 135 and a respective direction flag signal (Dir) 136. The ring generator 140 connected with the frequency converter 130 is used to receive both the pulse flag signal 135 and the direction flag signal 136 for further producing respective sled control signals (SLED1)170 and (SLED2)180. In the present invention, major purpose of the sled control signals 170 and 180 is to drive a sled motor 40. Preferably, the sled motor 40 can be a stepping motor. In particular, the stepping motor is a micro stepping motor for determining movement of the sled 65 of the optical storage device.

Referring to FIG. 2, the method for controlling a sled of an optical storage device in accordance with the present invention comprises: (a) moving the pick-up head 60 of the optical storage device for generating the tracking signal in which the pick-up head 60 includes the sled 65 and the lens 90; (b) sending the tracking signal to the tracking actuator's controller 110 of the optical storage device for further generating the tracking control signal (TRO) for controlling a position of the lens 90 of the pick-up head 60; (c) forwarding the tracking control signal to the numerical controller 120 of the optical storage device for generating the numerical control signal (DCV) 131; (d) inputting the numerical control signal to the frequency converter 130 of the optical storage device for generating the pulse flag signal (Pulse) 135 and the direction flag signal (Dir) 136; and (e) forwarding the pulse flag signal 135 and the direction flag signal 136 to the ring generator 140 of the optical storage device for generating the first sled control signal (SLED1) 170 and the second sled control signal (SLED2) 180 to drive the sled motor 40 of the optical storage device for controlling the sled 65 of the optical storage device. In the present invention, the sled motor 40 can be a stepping motor.

In the embodiment of FIG. 2, the control system of the optical storage device can further include a motor selector (DCM) 160 and a respective DC motor. In the case that the motor selector 160 is at a DC motor mode, the numerical control signal 131 generated by the numerical controller 120 can be used to drive the DC motor of the optical storage device for controlling the sled 65 of the optical storage device. On the other hand, in the case that the motor selector 160 is at a stepping motor mode, the numerical control signal 131 can be sent to the frequency converter 130 for further processing.

In the present invention, the ring generator 140 can further include a ring table for the ring generator 140 to check up respectively a sine value and a cosine value, as the first and second sled control signals (SLED1) 170 and (SLED2) 180, with respect to the pulse flag signal 135 and the direction flag signal 136. The sine and cosine values provided by the ring generator 140 can be sent through an attenuator (Ks) 150 for adjusting magnitudes thereof so that the present control system can pose a power-saving mode. Similarly, the sled control signals (SLED1) 170 and (SLED2) 180 can be sent through a power driver 20 for signal adjusting before arriving the sled motor 40.

Figure 3:
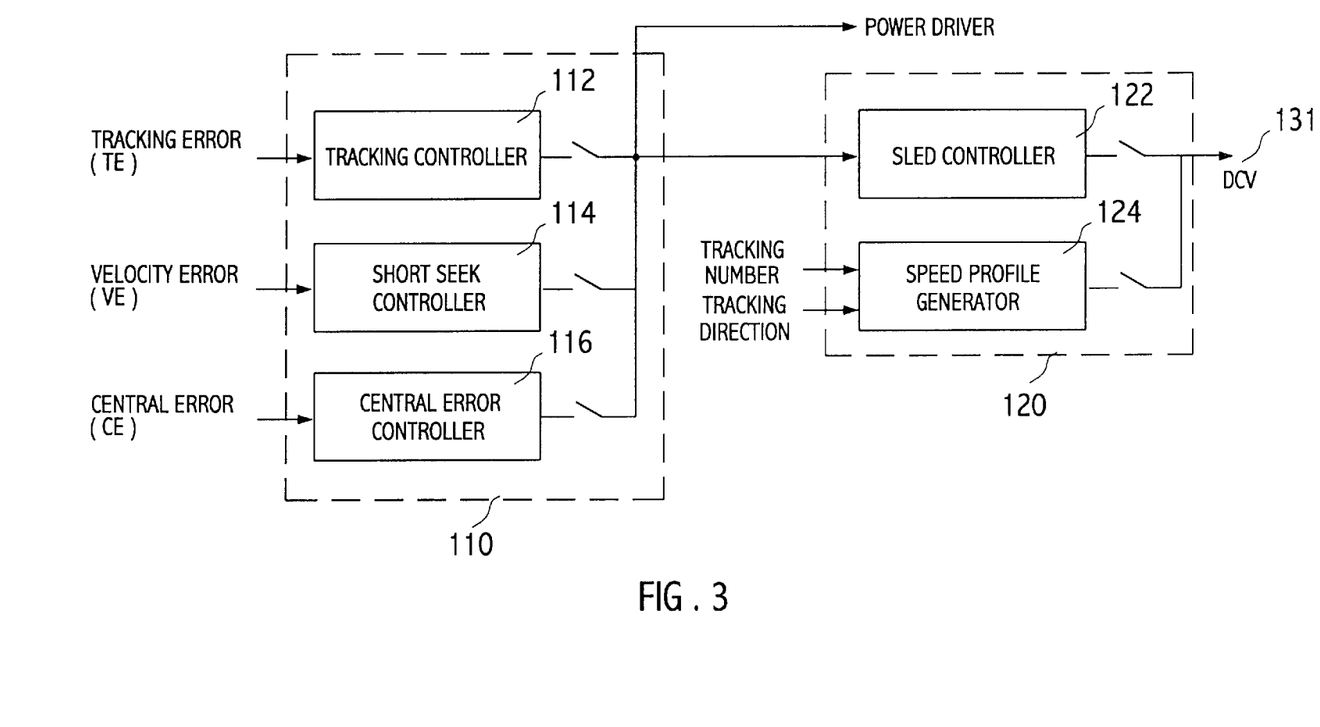
FIG. 3 is a block diagram to illustrate an internal electric connection between a preferred controller of the tracking actuator and a preferred numerical controller in accordance with the present invention.

Referring now to FIG. 3, detail explanations upon the tracking actuator's controller 110 and the numerical controller 120 is shown by a block diagram. As shown, the tracking actuator's controller 110 can further include a tracking controller 112, a short seek controller 114 and a central error controller 116. The output of the tracking actuator's controller 110 can be selected from these three controllers 112, 114 and 116. That is, the tracking control signal (TRO) provided by the tracking actuator's controller 110 can be generated by either one of these controllers 112, 114 and 116. The numerical controller 120 can further include a sled controller 122 and a speed profile generator 124. Similarly, the output (i.e., the numerical control signal DCV 131) of the numerical controller 120 can be provided either by the sled controller 122 or the speed profile generator 124.

Figure 4:
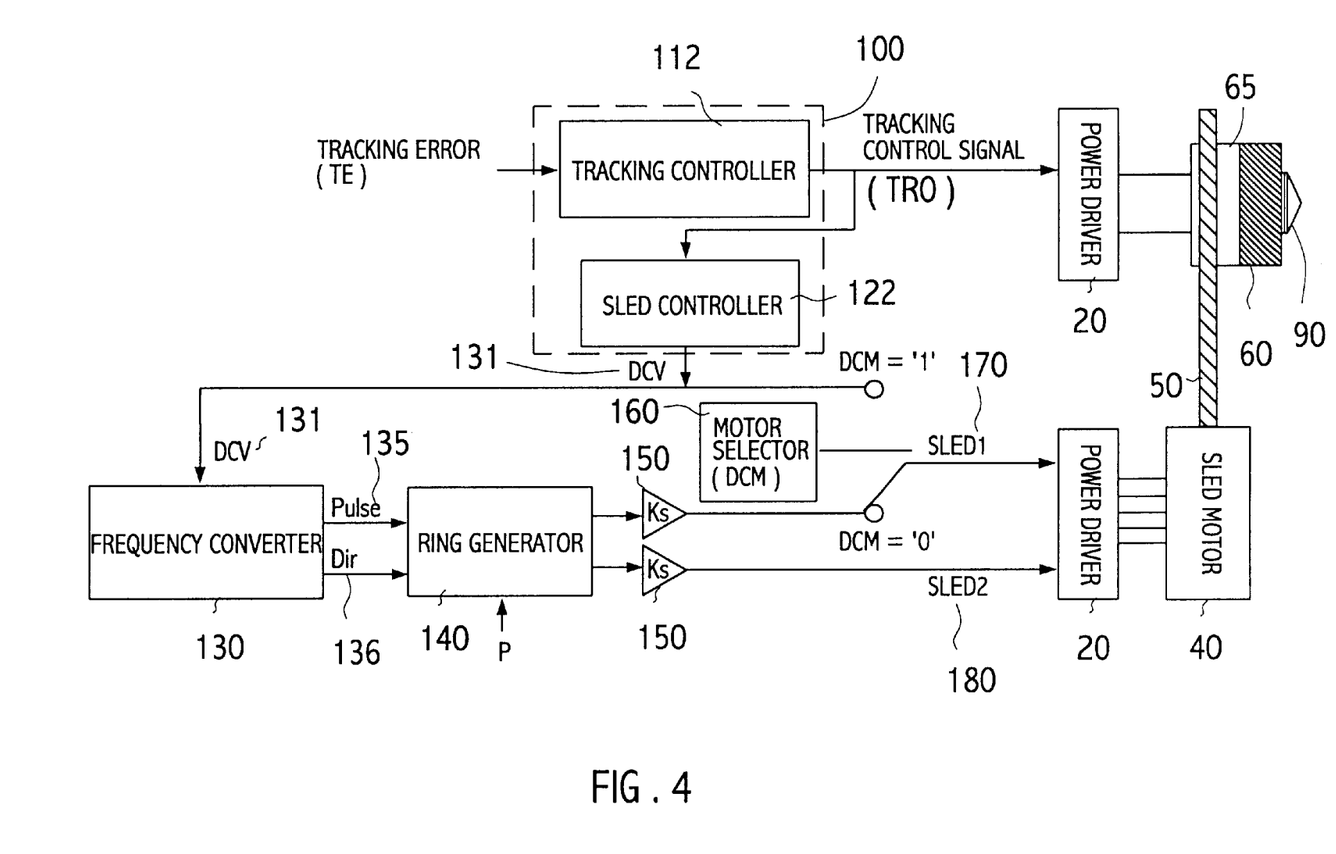
FIG. 4 shows a connection of major circuitries in accordance with the present invention while performing a tracking follow control.

Referring to FIG. 4, a connection of major circuitries in accordance with the present invention while performing the tracking follow control is shown. As shown, in the case that the optical storage device is at a tracking following control mode, the tracking signal can be a tracking error (TE) and the frequency converter 130 can be a voltage frequency converter. The tracking error (TE) is sent to the tracking controller 112 for generating the tracking control signal (TRO), and the tracking control signal (TRO) is then forwarded to the sled controller 122 of the numerical controller 120 for generating the numerical control signal (DCV) 131.

Figure 7:
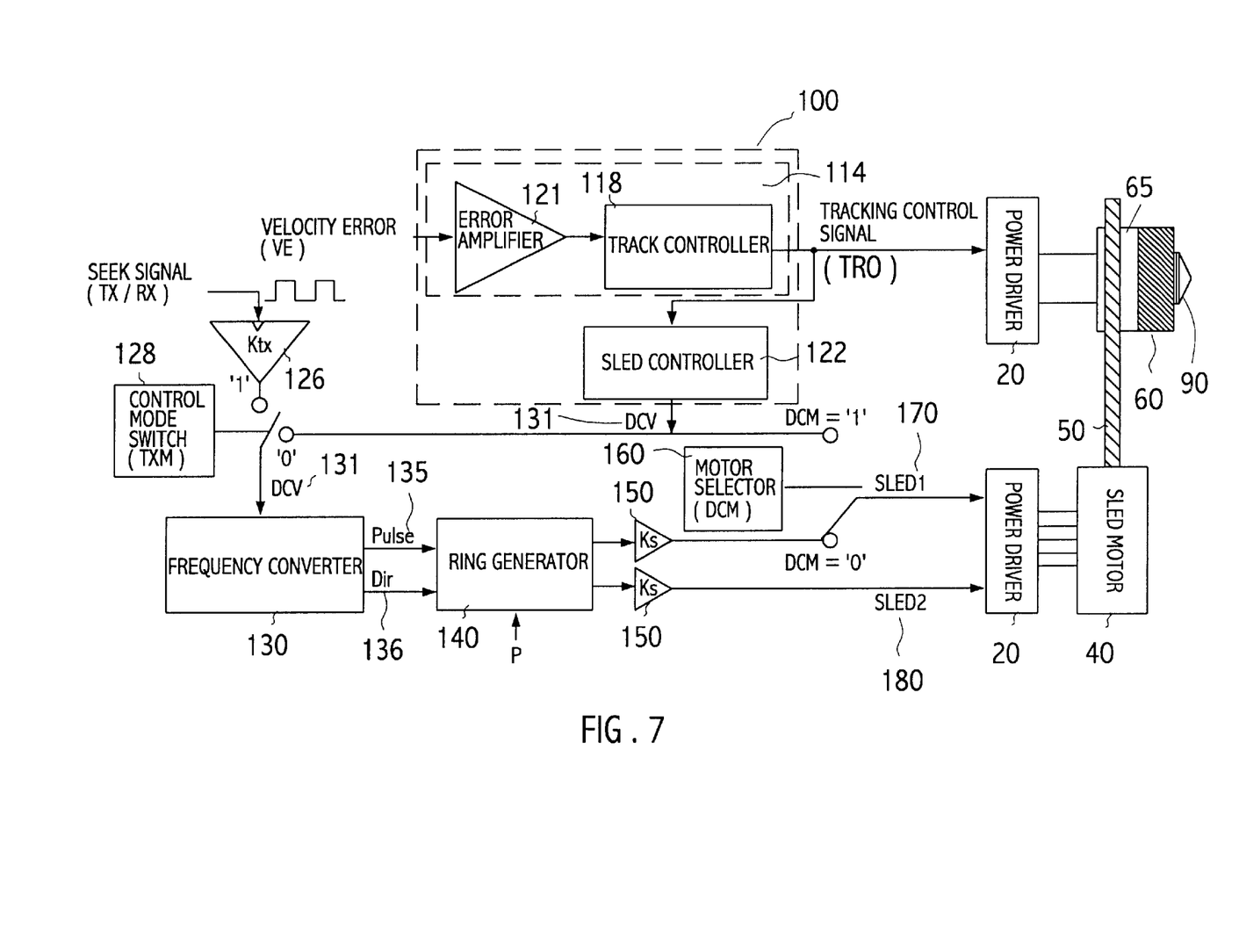
FIG. 7 is a block diagram showing a preferred connection among major circuitries in accordance with the present invention while performing a short seek control.

Referring now to FIG. 7, a connection among major circuitries in accordance with the present invention while performing a short seek control is shown. As shown, in the case that the optical storage device is at a short seek control mode, the tracking signal can be a velocity error (VE) and the frequency converter 130 can be a voltage frequency converter. The velocity error (VE) signal can be sent to the short seek controller 114 of the tracking actuator's controller 110 for generating the tracking control signal (TRO). The tracking control signal can then be forwarded to the sled controller 122 of the numerical controller 120 for generating the numerical control signal (DCV) 131. As shown, the short seek controller 114 can include an error amplifier 121 and a tracking controller 118.

Figure 8:
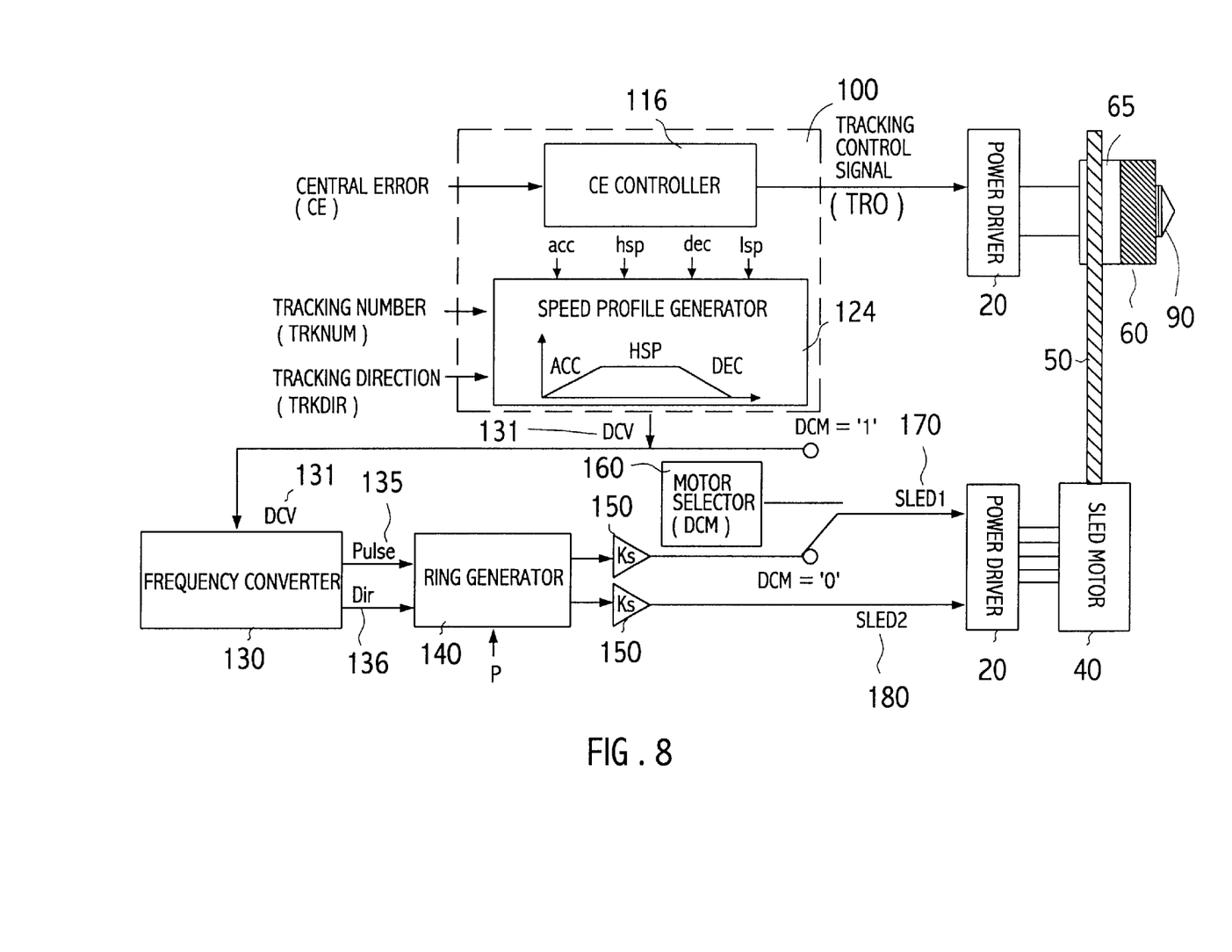
FIG. 8 is a block diagram showing a preferred connection among major circuitries in accordance with the present invention while performing a long seek control.

Referring now to FIG. 8, a connection among major circuitries in accordance with the present invention while performing a long seek control is shown. As shown, in the case that the optical storage device is at a long seek control mode, the tracking signal can be a central error (CE) signal and the frequency converter 130 can be a velocity frequency converter. The central error (CE) signal can be sent to the central error controller 116 of the tracking actuator's controller 110 for generating the tracking control signal (TRO) for controlling the lens 90 at a central position. The speed profile generator 124 of the numerical controller 120 can receive a tracking number signal (TRKNUM) and a tracking direction signal (TRKDIR) for generating the numerical control signal (DCV) 131.

While performing the tracking follow control of the present invention, the tracking controller 112 can control the lens 90 of the optical storage device to follow a predetermined track on the disk of the optical storage device. When the lens 90 deviates more and more from the center of the pick-up head 60, the sled motor 40 of the optical storage device can slowly rotate with the lens 90 so that the sled 65 can be moved slowly to maintain the lens 90 within an acceptable domain around the pick-up head 60. Thereby, the tilt problem of the lens 90 can be avoided. While performing the short seek control of the present invention, a close-loop control can be adopted so as to achieve a swift and accurate sled control. In this control, amplifying the velocity error can be executed prior to the sled control, or the feedback seek signal can be utilized to drive the sled based on the track number and the track distance. On the other hand, while performing the long seek control of the present invention, an open-loop control together with the application of the central error control are used to assure the lens 90 positioned at the central position, and then an accurate short seek control can be applied to complete the long seek control.

Following descriptions will be spent to detailedly explain these three control modes: the tracking follow control, the short seek control and the long seek control.

1. Tracking Follow Control

Referring to FIG. 4, the control system for controlling the sled of the optical storage device in accordance with the present invention is shown in a block diagram to demonstrate signal flow at a tracking follow control mode of the present invention. As shown, the control system includes a signal controller 100, a frequency converter 130 and a ring generator 140 arranged in series for signal transmission. In the tracking follow control mode of the present invention, the control system can produce a tracking signal upon the pick-up head 60 of the optical storage device is focusing on. The tracking signal is firstly sent to the signal controller 100 for generating a numerical control signal (DCV) 131. In this mode, the tracking signal is preferable to be a tracking error (TE). The frequency converter 130 connected with the signal controller 100 then receives the numerical control signal 131 and further produces thereby a pulse flag signal (Pulse) 135 and a direction flag signal (Dir) 136. The pulse flag signal (Pulse) 135 and the direction flag signal (Dir) 136 are then forwarded to the ring generator 140, connected with the frequency converter 130, for further producing sled control signals (SLED1) 170 and (SLED2) 180. The sled control signals (SLED1) 170 and (SLED2) 180 are used as the driving pulse signals for driving the sled motor 40 (preferably a stepping motor) of the optical storage device to move the sled 65 of the optical storage device to a predetermined position.

In the embodiment shown in FIG. 4, the signal controller 100 can include a tracking controller 112 and a sled controller 122. The tracking controller 112 is introduced to receive the tracking signal (say, a tracking error signal TE) and to generate the tracking control signal (TRO). The tracking control signal (TRO) is sent directly to the sled controller 122 for outputting the numerical control signal (DCV) 131. In this embodiment, the frequency converter 130 can be a voltage frequency converter. The frequency converter 130 is used to receive the numerical control signal (DCV) 131 and to output the pulse flag signal (Pulse) 135 and the direction flag signal (Dir) 136 to the ring generator 140. The ring generator 140 includes mainly a ring table for providing a sine pulse signal and a cosine pulse signal in accordance with the pulse flag signal (Pulse) 135 and the direction flag signal (Dir) 136.

In addition, by providing the embodiment shown in FIG. 4, the sine and cosine pulse signals can be forwarded to individual attenuators (Ks) 150 for attenuating the signals and then for achieving a power-saving mode. As shown, the control system can include a motor selector (DCM) 160 for switching the operation of the sled motor 40 between a DC motor mode (DCM="1") and a stepping motor mode (DCM="0"). Furthermore, the sled control signals (SLED1) 170 and (SLED2) 180 can be sent through a power driver 20 for necessarily adjusting before arriving the sled motor 40.

While the control system performing the tracking follow control, the tracking error (TE) is firstly provided to the tracking controller 112 which includes at least basic elements such as a gain, a phase lag controller, a phase lead controller and so on. Then, the tracking controller 112 can send out the tracking control signal (TRO) to the external power driver 20 mainly for driving the lens 90 of the pick-up head 60 to process a reading operation. It is noted that the sled 65 needs to synchronically move with the pick-up head 60 so as to maintain the lens 90 always at the center of the pick-up head 60. As shown, the tracking control signal (TRO) is also sent to the sled controller 122. In the case that the motor selector (DCM) 160 is at the mode of DCM="1", the DC motor is chosen and the numerical control signal (DCV) 131 generated by the sled controller 122 can be sent to produce the sled control signal (SLED1) 170 for controlling the DC motor. On the other hand, in the case that the motor selector (DCM) 16 is at the mode of DCM="0", the stepping motor is chosen and the numerical control signal (DCV) 131 can be sent to the frequency converter 130 for transforming the phased numerical control signal (DCV) 131 equivalently into the frequency pulse flag signal 135 and the direction flag signal 136.

Figure 5:
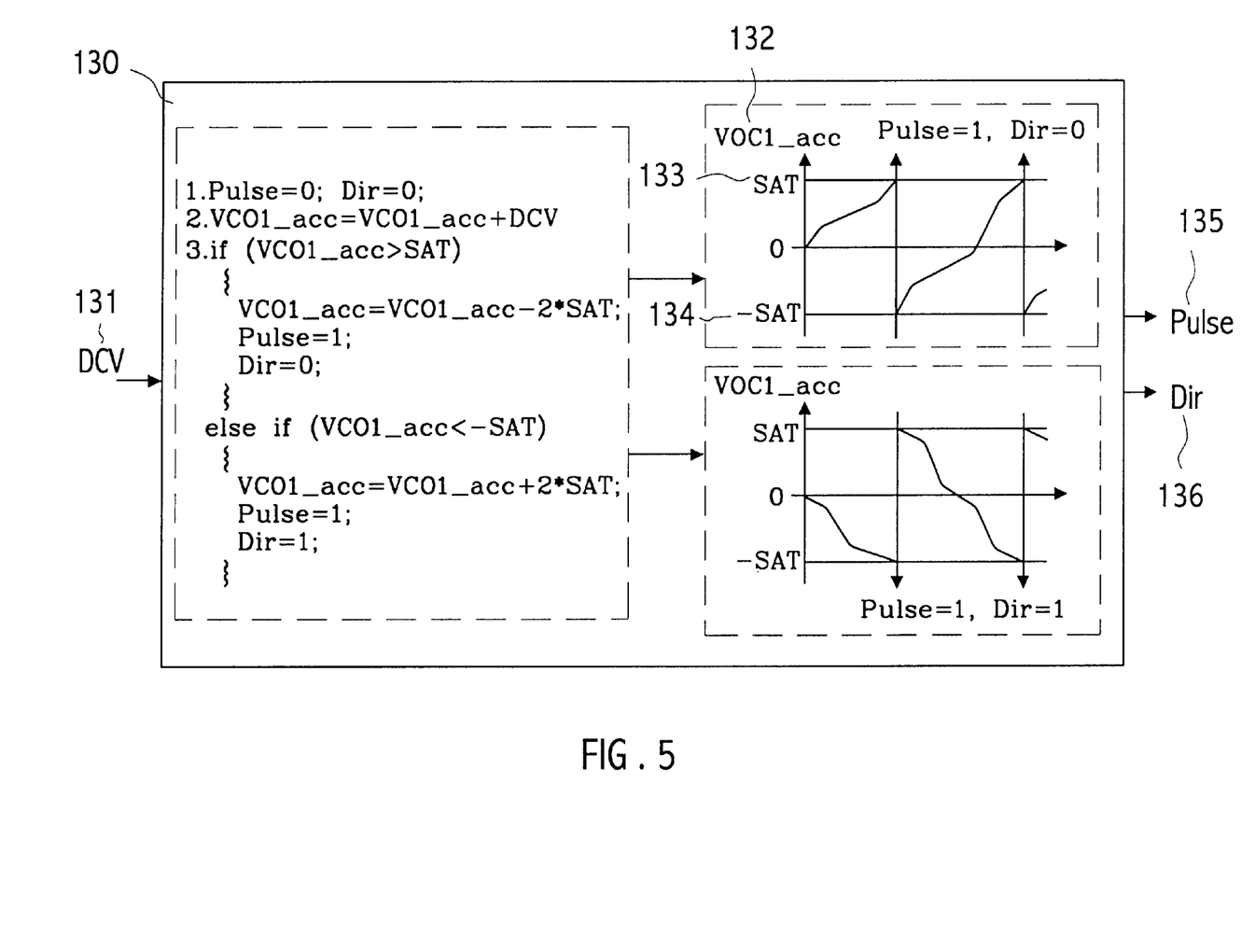
FIG. 5 shows an internal action of a preferred voltage frequency converter in accordance with the present invention while performing a tracking follow control.

In the tracking follow control mode of the present invention, the frequency converter 130 can be a voltage frequency converter (VCO1). Referring now to FIG. 5, an internal action of a preferred voltage frequency converter 130 in accordance with the present invention while performing a tracking follow control is shown. As shown, VCO1_acc 132 is an accumulator for accumulating every value of the numerical control signal 131. As long as the VCO1_acc 132 is greater than an upper limit (SAT) 133, the VCO1_acc 132 can automatically subtract a value of 2*SAT. At the same time, Flag signals with Pulse=1 and Dir=0 is provided to imply that a forward rotation pulse is generated. Contrarily, as long as the VCO1_acc 132 is lower than a lower limit (—SAT) 133, the VCO1_acc 132 can automatically add a value of 2*SAT. At the same time, Flag signals with Pulse=1 and Dir=1 is provided to imply that a reverse rotation pulse is generated. In either case, the pulse flag signal (Pulse) 135 and the direction flag signal (Dir) 136 can be forwarded to the ring generator 140 for obtaining a respective sine value and a respective cosine value.

Figure 6:
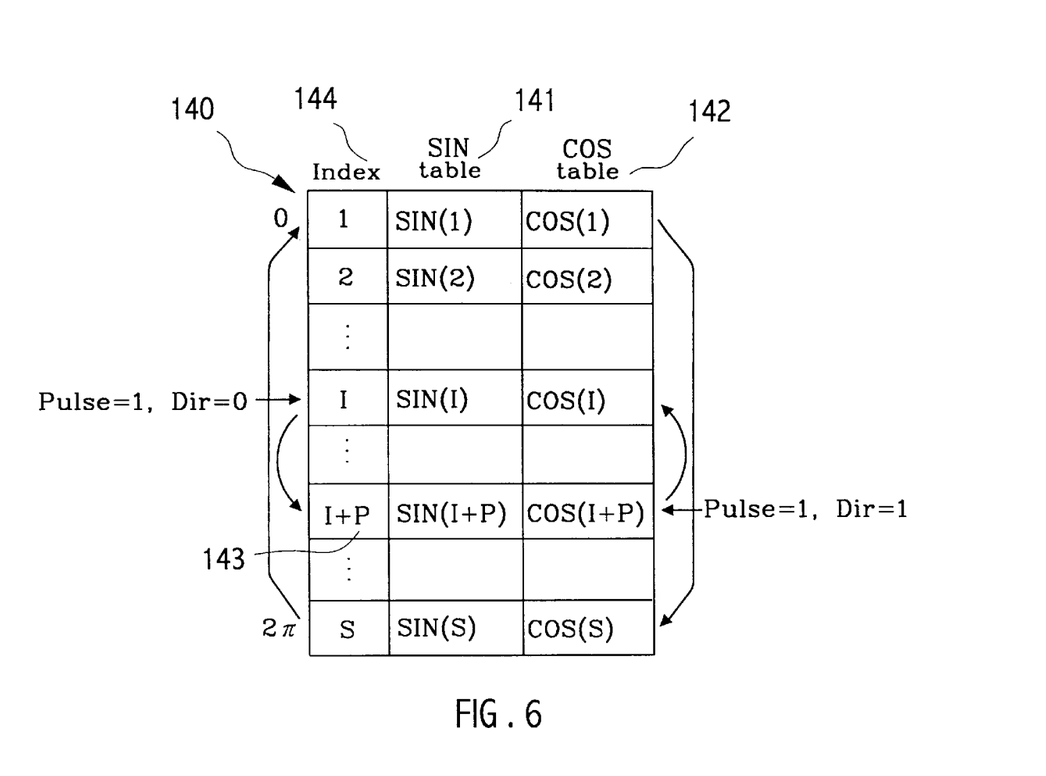
FIG. 6 is a preferred internal ring table of a preferred ring generator in accordance with the present invention while performing a tracking follow control.

Furthermore, referring to FIG. 6, a preferred ring table of the ring generator 140 in accordance with the present invention while performing a tracking follow control is schematically shown as a check-up table style. The ring table as a typical 2-D array of 2×S includes an internal storage of 0~2n sine table (SIN) 141 and cosine table (COS) 142. When the Flag signals are provided with Pulse=1 and Dir=0, an index 144 can forward to rotate for P spacing, in which the P value is a stepping value 143. In the case that the index 144 is greater than an S value (i.e. Index>S), the system can automatically reset the index value back to be index=1 for consecutively outputting signals of sine wave and cosine wave. In the case that Pulse=1 and Dir=0, the index 144 can reverse to rotate by P spacing. In the case that Index<1, the index 144 can be reset to the S value.

In addition, proper output of sine and cosine values obtained from the ring table are then sent through respective attenuators 150 to become the external sled control signals SLED1 170 and SLED2 180, respectively. When the motor selector 160 is at the stepping motor mode of DCM="0", the sled control signals SLED1 170 and SLED2 180 can be sent through respective power drivers 20 for driving the sled motor 40 (a stepping motor for example), as shown in FIG. 4. In the tracking follow control, the attenuator 150 can be low-adjusted so as to be operated in a power-saving mode for preventing the stepping from overheat.

2. Short Seek Control

Referring to FIG. 7, the control system for controlling the sled of the optical storage device in accordance with the present invention is shown in a block diagram to demonstrate signal flow at a short seek control mode of the present invention. As shown, the control system includes a signal controller 100, a frequency converter 130 and a ring generator 140 arranged in series for signal transmission. In the short seek control mode of the present invention, the pick-up head 60 of the optical storage device is firstly moved to generate a tracking signal. The tracking signal is then sent to the signal controller 100 for generating a numerical control signal (DCV) 131. In this mode, the tracking signal is preferable to be a velocity error (TE) signal. The frequency converter 130 then receives the numerical control signal 131 and further produces thereby a pulse flag signal (Pulse) 135 and a direction flag signal (Dir) 136. The pulse flag signal (Pulse) 135 and the direction flag signal (Dir) 136 are then forwarded to the ring generator 140, connected with the frequency converter 130, for further producing sled control signals (SLED1) 170 and (SLED2) 180. The sled control signals (SLED1) 170 and (SLED2) 180 are used as the driving pulse signals for driving the sled motor 40 (preferably a stepping motor) of the optical storage device to control the sled 65 of the optical storage device.

In the embodiment of the short seek control, the signal controller 100 can include a short seek controller 114 and a sled controller 122. The short seek controller 114 can further include an error amplifier 121 and a tracking controller 118. The error amplifier 121 is used to receive and amplify the velocity error signal VE. The amplified velocity error signal (VE) is then sent to the tracking controller 118 for generating the tracking control signal (TRO). The tracking control signal (TRO) is sent directly to both the power driver 20 and the sled controller 122 for outputting the numerical control signal (DCV) 131. In this embodiment, the frequency converter 130 can be a voltage frequency converter (VCO1).

In accordance with the present invention, two types of the short seek control are provided. Except for the algorithm stated above, another type of control is a feedback seek signal control method as follows. As shown in FIG. 7, the control system can include a signal gain device (Ktx) 126 and a control mode switch (TXM) 128. The signal gain device 126 is used to receive and amplify the seek signal (TX/RX). The amplified seek signal (TX/RX) is then forwarded to the control mode switch (TXM) 128. The control mode switch 128 is mainly used to provide a control mode signal for helping the frequency converter 130 determine if the numerical control signal (DCV) 131 generated by the sled controller 122 or the amplified seek signal (Ktx value) is to be received. Then, the frequency converter 130 can output the pulse flag signal (Pulse) 135 and the direction flag signal (Dir) 136 to the ring generator 140 through a voltage frequency transformation.

Similarly, in the short seek control, the ring generator 140 connected with the frequency converter 130 includes mainly a ring table for providing a sine pulse signal and a cosine pulse signal corresponding to the pulse flag signal (Pulse) 135 and the direction flag signal (Dir) 136. In addition, the output terminals of the ring generator 140 is further connected with a pair of attenuators (Ks) 150 for increasing the power during the short seek control by enlarging the attenuating values. As shown, the control system can include a motor selector (DCM) 160 for switching the operation of the sled motor 40 between a DC motor mode (DCM="1") and a stepping motor mode (DCM="0"). Furthermore, the sled control signals (SLED1) 170 and (SLED2) 180 after substantial attenuation at the respective attenuators 150 are used as the pulse signals for driving the sled motor 40.

On the other hand, in the short seek control of FIG. 7, a close loop control is present. According to the present invention, two types of control algorithms as follow can be provided to fulfill the close loop short seek control shown in FIG. 7.

2-1. First Type of the Short Seek Control

In this application, the velocity error (VE) of the track seek is amplified by the error amplifier 121 and is then provided to the track controller 118 for producing the tracking control signal (TRO). The tracking control signal (TRO) is sent to the sled controller 122 for further obtaining a control voltage signal, i.e. the numerical control signal (DCV) 131. In this control, gain and bandwidth of the sled controller 122 are different to those of the sled controller 122 in the previous tracking control. In addition, the stepping motor mode is set by putting DCM="0" at the motor selector 160. On the other hand, TXM="0" at the control mode switch (TXM) 23 is the control mode applying the tracking control signal (TRO). Similar to the previous tracking control, the short seek control utilizes the frequency converter 130, the ring generator 140 and the attenuators 150 for forming the sled control signals (SLED1) 170 and (SLED2) 180 to driving the stepping motor.

2-2. Second Type of the Short Seek Control

In this application, the feedback seek signal (TX or RX) is used to directly drive the stepping motor of the sled motor 40 in accordance with the tracking number and the track pitch. The relationship between the driving pulse number PN of the stepping motor and the tracking number is:

$$PN=TN*TP/\text{Plength} \qquad (1)$$

in which PN is the driving pulse number PN of the stepping motor,

Plength is a movement ($\mu$m) of the sled per pulse of the stepping motor per,

TN is the track number, and

TP is the track pitch (1.6 $\mu$m, typically).

While the control system performing a track seek, every front of the seek signal (TX or RX) can be used to trigger one magnifying operation at the signal gain device 126. In the case that the control mode switch (TXM) 128 is set at TXM="1", the frequency converter 130 upon meeting a front of the seek signal (TX or RX) can receive a respective gain from the signal gain device Ktx 126. In this type of control, all following control algorithms are the same as those in the previous tracking control. That is, the ring generator 140 and the attenuators 150 are used to generate the sled control signals (SLED1) 170 and (SLED2) 180 for further forming the driving pulse signals to drive the stepping motor. Moreover, while in short seek control, the attenuation rate of the attenuator 150 can be enlarged to increase the power for the short track seek.

3. Long Seek Control

Referring to FIG. 8, the control system for controlling the sled of the optical storage device in accordance with the present invention is shown in a block diagram to demonstrate signal flow at a long seek control mode of the present invention. As shown, the control system includes a signal controller 100, a frequency converter 130 and a ring generator 140. The signal controller 100 is used to receive the tracking signal, preferably a central error in this long seek control mode, for generating a numerical control signal (DCV) 131. The frequency converter 130 connected with the tracking controller 100 then receives the numerical control signal 131 to further produce a pulse flag signal (Pulse) 135 and a direction flag signal (Dir) 136. The pulse flag signal (Pulse) 135 and the direction flag signal (Dir) 136 are then forwarded to the ring generator 140, connected with the frequency converter 130, for further producing sled control signals (SLED1) 170 and (SLED2) 180. The sled control signals (SLED1) 170 and (SLED2) 180 are used as the driving pulse signals for driving the sled motor 40 (preferably a stepping motor) of the optical storage device to control the sled 65 of the optical storage device.

According to the present invention, the long seek control comprises: (a) focusing on the pick-up head 60 of the optical storage device for generating a central error (CE) signal as the tracking signal; (b) sending the central error (CE) signal to the tracking controller 100 of the optical storage device for further generating the numerical control signal (DCV) 131; (c) inputting the numerical control signal to the frequency converter 130 of the optical storage device for generating the pulse flag signal (Pulse) 135 and the direction flag signal (Dir) 136; and (d) forwarding the pulse flag signal 135 and the direction flag signal 136 to the ring generator 140 of the optical storage device for generating the sled control signals (SLED1) 170 and (SLED2) 180 to drive the stepping motor of the optical storage device for controlling the sled 65 of the optical storage device.

In the control system for performing the long seek control of the present invention shown in FIG. 8, the signal controller 100 can include a CE controller 116 and a speed profile generator 124. The CE controller 116 is used to receive the central error (CE) and thereby to generate the tracking control signal (TRO). The speed profile generator 124 is used to receive a tracking number signal (TRKNUM) and a tracking direction signal (TRKDIR) for further generating the numerical control signal (DCV) 131. Then, the numerical control signal 131 is sent to the frequency converter 130. In the long seek control, the frequency converter 130 can be a velocity frequency converter (VCO2) which acts similarly to the previous voltage frequency converter (VCO1), except for an upper limit of f1 and a lower limit of 0. As shown, an accumulator of the velocity frequency converter (VCO2) can be introduced to accumulate every value of the numerical control signal 131. When the accumulated value is greater than f1, the accumulator can automatically subtract a value of f1. Thus, the frequency converter 130 can receive the numerical control signal 131 and then produce, through a specific transformation, the pulse flag signal (Pulse) 135 and the direction flag signal (Dir) 136.

As shown in FIG. 8, a ring generator 140 is also provided. The ring generator 140 connected with the frequency converter 130 includes mainly a check-up ring table for providing a sine pulse signal and a cosine pulse signal corresponding to the pulse flag signal (Pulse) 135 and the direction flag signal (Dir) 136. In addition, the output terminals of the ring generator 140 is further connected with a pair of attenuators (Ks) 150 for increasing the power during the long seek control by enlarging the attenuating values. As shown, the control system can include a motor selector (DCM) 160 for switching the operation of the sled motor 40 between a DC motor mode (DCM="1") and a stepping motor mode (DCM="0"). Furthermore, the sled control signals (SLED1) 170 and (SLED2) 180 after substantial attenuation at the respective attenuators 150 are used as the pulse signals for driving the sled motor 40.

As shown in FIG. 8, the long seek control of the present invention can be an open loop control. At this application, the signal controller 100 is switched to proceed the central error control mode. The central error (CE) is provided to the CE controller 116 for generating the respective tracking control signal to control the lens 90 of the pick-up head 60 of the optical storage device to remain at a center position. The CE controller 116 can include several internal elements such as a gain, a low-pass filter, a phase-lead filter, a phase-lag filter and so on.

Figure 9:
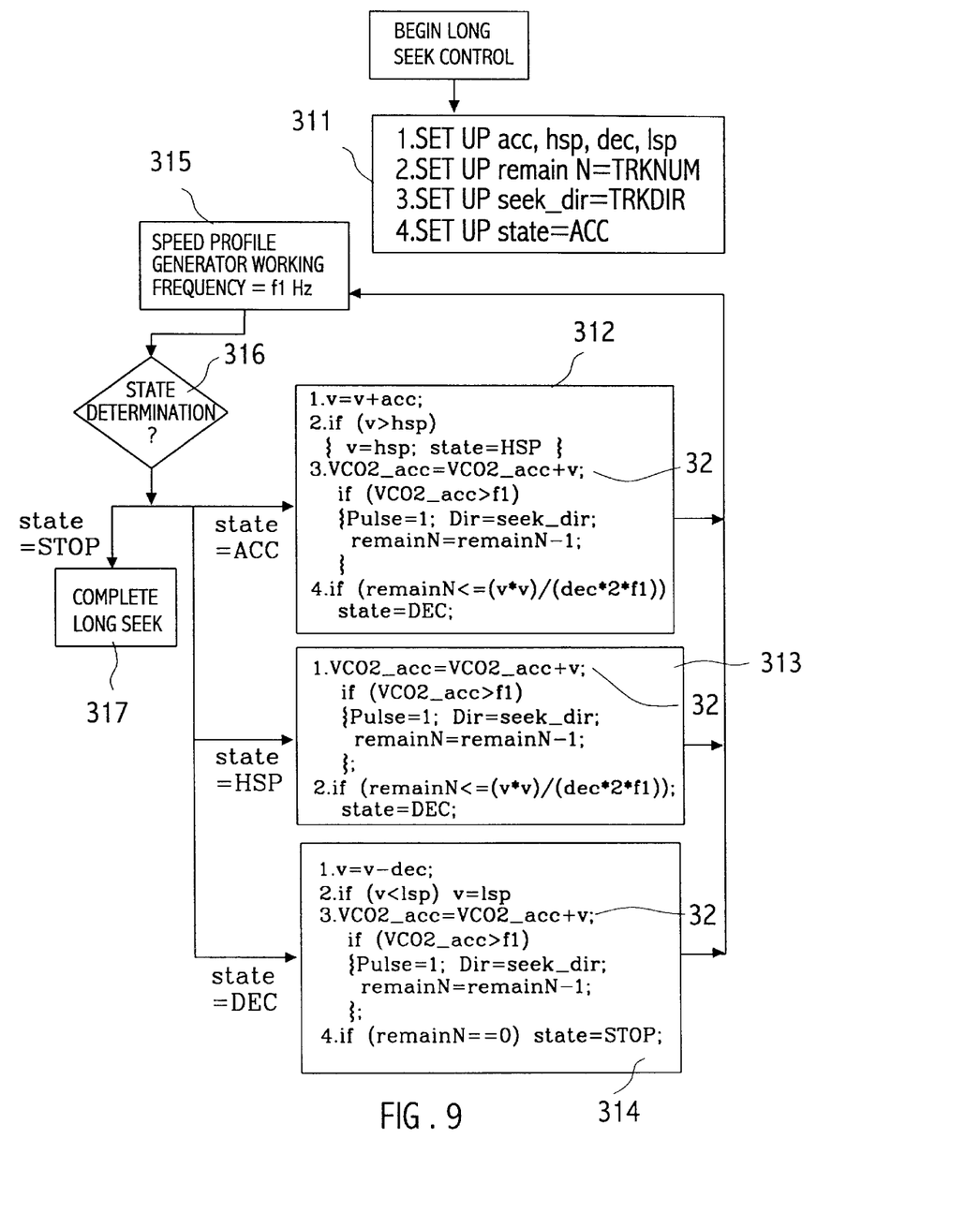
FIG. 9 is a flowchart to show a preferred speed profile generator and a preferred speed frequency converter in accordance with the present invention while performing a long seek control.

Furthermore, as shown in FIG. 8, the long seek control of the present invention is mainly constructed by the speed profile generator 124 and the frequency converter 130 (preferably, a velocity frequency converter VCO2). A typical control flow of the speed profile generator 124 is shown in FIG. 9. As step 311 shown in FIG. 9, the speed profile generator 124 can setup an acceleration (ACC), a highest speed (HSP), a deceleration (DEC), a lowest speed (LSP), a tracking number (TRKNUM) and a tracking direction (TRKDIR). Meanwhile, the initial state is preset to be an acceleration (state=ACC) for starting the long seek control. In step 315, an intermediary service is provided to allow the setting of the working frequency to be f1 Hz. In following step 316, the operation state can be determined to be an acceleration (ACC), a highest speed (HSP), a deceleration (DEC), or a stop of track seek.

3–1. In the case of state=ACC, the state is an acceleration that step 312 is performed. The step 312 includes (1) a sub-step of accelerating, (2) a sub-step of determining whether or not the highest speed is reached (if positive, state=HSP), (3) a sub-step of determining whether or not the velocity frequency converter (VCO2) can send out the pulse flag signal (Pulse), and (4) a sub-step of determining whether or not the lowest speed is reached (if positive, state=DEC).

3–2. In the case of state=HSP, step 313 is performed to include (1) a sub-step of determining whether or not the velocity frequency converter (VCO2) can send out the pulse flag signal (Pulse), and (2) a sub-step of determining whether or not a slow-down is required (if positive, state=DEC).

3–3. In the case of state=DEC, step 314 is performed to include (1) a sub-step of decelerating, (2) a sub-step of determining whether or not the lowest speed is achieved, (3) a sub-step of determining whether or not the velocity frequency converter (VCO2) can send out the pulse flag signal (Pulse), and (4) a sub-step of determining whether or not number of remaining tracks is zero (if positive, state= STOP).

All the following control movements of the long seek control are the same as those stated in previous tracking follow control. That is, the ring generator 140 and the attenuators 150 are used to generate the sled control signals (SLED1) 170 and (SLED2) 180 for further forming the driving pulse signals to drive the stepping motor of the sled motor 40. Moreover, while in long seek control, the attenuation rate of the attenuator 150 can be enlarged to increase the power for the short track seek.

4. Advantages of the Present Invention

Figure 10:
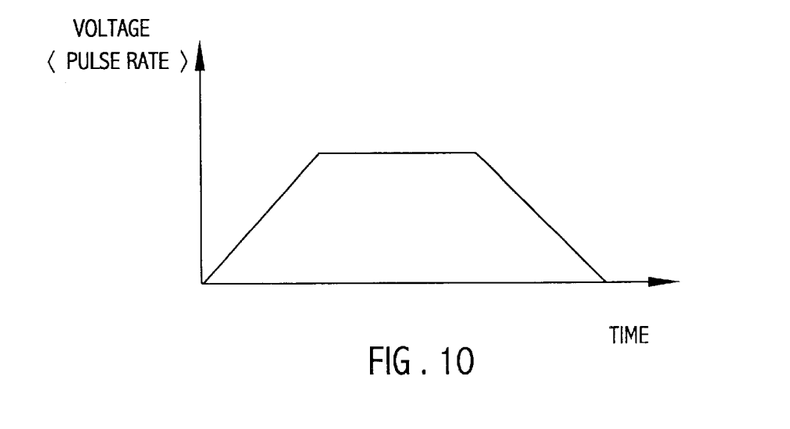
FIG. 10 shows a time-voltage relationship of the speed of the speed profile generator in accordance with the present invention while performing a long seek control.

In an experiment, the application of the control system and the control method upon a CD-RW player in accordance with the present invention has been shown to be successful. Referring to FIG. 10, it is found that the velocity (represented by the sensed voltage, Y axis in the figure) controlled by the speed profile generator varies linearly, not step-wisely. Obviously, the disadvantage of the step-wise output in the prior art has been improved. By applying the stepping motor to control the sled of the optical storage device, the speed profile of the sled can better meet the equipment requirements upon the accelerating and decelerating operation, so that vibrations and noise caused by moving the sled can be avoided. In addition, because the stepping motor has various advantages over the DC motor, such as low cost, low photo detection feedback, low magnetic detection feedback and high speed movement, it is the trend that the stepping motor is used to replace the DC motor in almost all applications.

Moreover, the present invention can directly use an IC to replace the CPU in the prior art so that ease in programming and simplicity in circuitry design can be obtained and thereby the production cost of the optical storage device can be reduced.

By providing the control system and the control method in accordance with the present invention, the advantages of the optical storage device upon less noise, less vibration, low cost and simplified circuiting can be easily achieved.

While the present invention has been particularly shown and described with reference to a preferred embodiment, it will be understood by those skilled in the art that various changes in form and detail may be without departing from the spirit and scope of the present invention.

What is claimed is:

1. A method for controlling a sled of an optical storage device, comprising:
   (a) moving a pick-up head of the optical storage device for generating a tracking signal, the pick-up head including thereof the sled and a lens;
   (b) sending the tracking signal to a tracking actuator's controller of the optical storage device for further generating a tracking control signal (TRO) for controlling a position of the lens of the pick-up head;
   (c) forwarding the tracking control signal to a numerical controller of the optical storage device for generating a numerical control signal (DCV);
   (d) inputting the numerical control signal to a frequency converter of the optical storage device for generating a pulse flag signal and a direction flag signal; and
   (e) forwarding the pulse flag signal and the direction flag signal to a ring generator of the optical storage device for generating a sled control signal that is used to drive a stepping motor of the optical storage device for controlling the sled of the optical storage device.

2. The method for controlling a sled of an optical storage device according to claim 1, wherein the optical storage device further includes thereof a motor selector and a DC motor; in the case that the motor selector is at a DC motor mode, said numerical control signal in said step (c) is used to drive the DC motor of the optical storage device for controlling said sled of the optical storage device; and in the case that the motor selector is at a stepping motor mode, said numerical control signal is sent to said frequency converter for performing said step (d) and said step (d).

3. The method for controlling a sled of an optical storage device according to claim 1, wherein said ring generator further includes a ring table for said ring generator to check up respectively a sine value and a cosine value as said sled control signal with respect to said pulse flag signal and said direction flag signal.

4. The method for controlling a sled of an optical storage device according to claim 1, wherein said tracking actuator's controller of the optical storage device further includes thereof a tracking controller; said numerical controller further includes thereof a sled controller; and in the case that the optical storage device is at a tracking following control mode, said tracking signal is sent to the tracking controller of said tracking actuator's controller for generating said tracking control signal, and said tracking control signal is further forwarded to the sled controller of said numerical controller for generating said numerical control signal.

5. The method for controlling a sled of an optical storage device according to claim 4, wherein said frequency converter is a voltage frequency converter.

6. The method for controlling a sled of an optical storage device according to claim 4, wherein said tracking signal is a tracking error signal (TE).

7. The method for controlling a sled of an optical storage device according to claim 1, wherein said tracking actuator's controller of the optical storage device further includes thereof a short seek controller; said numerical controller further includes thereof a sled controller; and in the case that the optical storage device is at a short seek control mode, said tracking signal is sent to the short seek controller of said tracking actuator's controller for generating said tracking control signal, and said tracking control signal is further forwarded to the sled controller of said numerical controller for generating said numerical control signal.

8. The method for controlling a sled of an optical storage device according to claim 7, wherein said frequency converter is a voltage frequency converter.

9. The method for controlling a sled of an optical storage device according to claim 7, wherein said tracking signal is a velocity error signal (VE).

10. The method for controlling a sled of an optical storage device according to claim 7, wherein said short seek controller further includes thereof an error amplifier and a tracking controller, for receiving and amplifying said tracking signal and for receiving the amplified tracking signal to further generate said tracking control signal, respectively.

11. The method for controlling a sled of an optical storage device according to claim 1, wherein said tracking actuator's controller of the optical storage device further includes thereof a central error controller; said numerical controller further includes thereof a speed profile generator; and in the case that the optical storage device is at a long seek control mode, said tracking signal is sent to the central error controller of said tracking actuator's controller for generating said tracking control signal for controlling said lens at a central position, and the speed profile generator of said numerical controller is used to receive a tracking number signal (TRKNUM) and a tracking direction signal for generating said numerical control signal.

12. The method for controlling a sled of an optical storage device according to claim 11, wherein said frequency converter is a velocity frequency converter.

13. The method for controlling a sled of an optical storage device according to claim 11, wherein said tracking signal is a central error signal (CE).

14. A method for controlling a sled of an optical storage device, comprising:
   (a) moving a pick-up head of the optical storage device for generating a tracking signal;
   (b) sending the tracking signal to a signal controller of the optical storage device for further generating a numerical control signal;
   (c) forwarding the numerical control signal to a frequency converter of the optical storage device for generating a pulse flag signal and a direction flag signal; and
   (d) forwarding the pulse flag signal and the direction flag signal to a ring generator of the optical storage device for generating a sled control signal that is used to drive a stepping motor of the optical storage device for controlling the sled of the optical storage device.

15. The method for controlling a sled of an optical storage device according to claim 14, wherein the optical storage device further includes thereof a motor selector and a DC motor; in the case that the motor selector is at a DC motor mode, said numerical control signal in said step (b) is used to drive the DC motor of the optical storage device for controlling said sled of the optical storage device.

16. The method for controlling a sled of an optical storage device according to claim 14, wherein said ring generator further includes a ring table for said ring generator to check up respectively a sine value and a cosine value as said sled control signal with respect to said pulse flag signal and said direction flag signal.

17. The method for controlling a sled of an optical storage device according to claim 14, wherein said signal controller of the optical storage device further includes thereof a tracking controller and a sled controller; and in the case that the optical storage device is at a tracking following control mode, said tracking signal is sent to the tracking controller for generating a tracking control signal, and the tracking control signal is further forwarded to the sled controller for generating said numerical control signal.

18. The method for controlling a sled of an optical storage device according to claim 17, wherein said frequency converter is a voltage frequency converter.

19. The method for controlling a sled of an optical storage device according to claim 17, wherein said tracking signal is a tracking error signal (TE).

20. The method for controlling a sled of an optical storage device according to claim 14, wherein said signal controller of the optical storage device further includes thereof a short seek controller and a sled controller; and in the case that the optical storage device is at a short seek control mode, said tracking signal is sent to the short seek controller for generating a tracking control signal, and the tracking control signal is further forwarded to the sled controller for generating said numerical control signal.

21. The method for controlling a sled of an optical storage device according to claim 20, wherein said frequency converter is a voltage frequency converter.

22. The method for controlling a sled of an optical storage device according to claim 20, wherein said tracking signal is a velocity error signal (VE).

23. The method for controlling a sled of an optical storage device according to claim 20, wherein said short seek controller further includes thereof an error amplifier and a tracking controller, for receiving and amplifying said tracking signal and for receiving the amplified tracking signal to further generate said tracking control signal, respectively.

24. The method for controlling a sled of an optical storage device according to claim 14, wherein said signal controller of the optical storage device further includes thereof a signal gain device and a control mode switch; and in the case that the optical storage device is at a short seek control mode, the control mode switch is then at a predetermined mode, said tracking signal triggers the signal gain device for performing a gain operation to produce said tracking control signal, and the tracking control signal is further forwarded to the sled controller for generating said numerical control signal.

25. The method for controlling a sled of an optical storage device according to claim 24, wherein said frequency converter is a voltage frequency converter.

26. The method for controlling a sled of an optical storage device according to claim 24, wherein said tracking signal is a seek signal.

27. The method for controlling a sled of an optical storage device according to claim 14, wherein said signal controller of the optical storage device further includes thereof a central error controller and a speed profile controller; and in the case that the optical storage device is at a long seek control mode, said tracking signal is sent to the central error controller for generating a tracking control signal for controlling a position of a lens of said pick-up head, and the speed profile generator of said numerical controller is used to receive a tracking number signal (TRKNUM) and a tracking direction signal (TRKDIR) for generating said numerical control signal.

28. The method for controlling a sled of an optical storage device according to claim 27, wherein said frequency converter is a velocity frequency converter.

29. The method for controlling a sled of an optical storage device according to claim 27, wherein said tracking signal is a central error signal (CE).

30. A control system of an optical storage device, utilizing a stepping motor to control a sled of the optical storage device, the optical storage device including a pick-up head, the pick-up head having a lens and the sled, comprising:
   a tracking actuator's controller for receiving a tracking signal to further generate a tracking control signal for controlling a position of the lens;
   a numerical controller, connected with the tracking actuator's controller, for receiving the tracking control signal to further generate a numerical control signal;
   a frequency converter, connected with the numerical controller, for receiving the numerical control signal to further generate a pulse flag signal and a direction flag signal; and
   a ring generator, connected with the frequency converter, for receiving the pulse flag signal and the direction flag signal to further generate a sled control signal for driving the stepping motor of the optical storage device to control the sled of the optical storage device.

31. The control system of an optical storage device according to claim 30, wherein the optical storage device further includes thereof a motor selector and a DC motor; in the case that the motor selector is at a DC motor mode, said numerical control signal generated by said numerical controller is used to drive the DC motor of the optical storage device for controlling said sled of the optical storage device; and in the case that the motor selector is at a stepping motor mode, said numerical control signal is forwarded to said frequency converter.

32. The control system of an optical storage device according to claim 30, wherein said ring generator further includes thereof a ring table for said ring generator to check up respectively a sine value and a cosine value, as respectively a first sled signal and a second sled signal, with respect to said pulse flag signal and said direction flag signal.

33. The control system of an optical storage device according to claim 30, wherein said tracking actuator's controller of the optical storage device further includes thereof a tracking controller; said numerical controller further includes thereof a sled controller; and in the case that the optical storage device is at a tracking following control mode, said tracking signal is sent to the tracking controller for generating said tracking control signal, and said tracking control signal is further forwarded to the sled controller for generating said numerical control signal.

34. The control system of an optical storage device according to claim 33, wherein said frequency converter is a voltage frequency converter.

35. The control system of an optical storage device according to claim 33, wherein said tracking signal is a tracking error signal (TE).

36. The control system of an optical storage device according to claim 30, wherein said tracking actuator's controller of the optical storage device further includes thereof a short seek controller; said numerical controller further includes thereof a sled controller; and in the case that the optical storage device is at a short seek control mode, said tracking signal is sent to the short seek controller of said tracking actuator's controller for generating said tracking control signal, and said tracking control signal is further forwarded to the sled controller of said numerical controller for generating said numerical control signal.

37. The control system of an optical storage device according to claim 36, wherein said frequency converter is a voltage frequency converter.

38. The control system of an optical storage device according to claim 36, wherein said tracking signal is a velocity error signal (VE).

39. The control system of an optical storage device according to claim 36, wherein said short seek controller further includes thereof an error amplifier and a tracking controller, in which said tracking signal is sent to said short seek controller of said tracking actuator's controller for generating said tracking control signal.

40. The control system of an optical storage device according to claim 30, wherein said tracking actuator's controller of the optical storage device further includes thereof a central error controller; said numerical controller further includes thereof a speed profile generator; and in the case that the optical storage device is at a long seek control mode, said tracking signal is sent to the central error controller of said tracking actuator's controller for generating said tracking control signal for controlling said lens at a central position, and the speed profile generator of said numerical controller is used to receive a tracking number signal (TRKNUM) and a tracking direction signal (TRKDIR) for generating said numerical control signal.

41. The control system of an optical storage device according to claim 40, wherein said frequency converter is a velocity frequency converter.

42. The control system of an optical storage device according to claim 40, wherein said tracking signal is a central error signal (CE).

43. A control system of an optical storage device, utilizing a stepping motor to control a sled of the optical storage device, the optical storage device including a pick-up head, the pick-up head having a lens and the sled, comprising:

a signal controller for receiving a tracking signal to further generate a numerical control signal;

a frequency converter, connected with the signal controller, for receiving the numerical control signal to further generate a pulse flag signal and a direction flag signal; and a ring generator, connected with the frequency converter, for receiving the pulse flag signal and the direction flag signal to further generate a sled control signal for driving the stepping motor of the optical storage device to control the sled of the optical storage device.

44. The control system of an optical storage device according to claim 43, wherein the optical storage device further includes thereof a motor selector and a DC motor; in the case that the motor selector is at a DC motor mode, said numerical control signal generated by said signal controller is used to drive the DC motor of the optical storage device for controlling said sled of the optical storage device; and in the case that the motor selector is at a stepping motor mode, said numerical control signal is forwarded to said frequency converter.

45. The control system of an optical storage device according to claim 43, wherein said ring generator further includes thereof a ring table for said ring generator to check up respectively a sine value and a cosine value as said sled control signal with respect to said pulse flag signal and said direction flag signal.

46. The control system of an optical storage device according to claim 43, wherein said signal controller of the optical storage device further includes thereof a tracking controller and a sled controller; and in the case that the optical storage device is at a tracking following control mode, said tracking signal is sent to the tracking controller for generating a tracking control signal, and the tracking control signal is further forwarded to the sled controller for generating said numerical control signal.

47. The control system of an optical storage device according to claim 46, wherein said frequency converter is a voltage frequency converter.

48. The control system of an optical storage device according to claim 46, wherein said tracking signal is a tracking error signal (TE).

49. The control system of an optical storage device according to claim 43, wherein said signal controller of the optical storage device further includes thereof a short seek controller and a sled controller; and in the case that the optical storage device is at a short seek control mode, said tracking signal is sent to the short seek controller for generating a tracking control signal, and the tracking control signal is further forwarded to the sled controller for generating said numerical control signal.

50. The control system of an optical storage device according to claim 49, wherein said frequency converter is a voltage frequency converter.

51. The control system of an optical storage device according to claim 49, wherein said tracking signal is a velocity error signal (VE).

52. The control system of an optical storage device according to claim 49, wherein said short seek controller further includes thereof an error amplifier and a tracking controller, for receiving and amplifying said tracking signal and for receiving the amplified tracking signal to generate said tracking control signal.

53. The control system of an optical storage device according to claim 43, wherein said signal controller of the optical storage device further includes thereof a signal gain device and a control mode switch; and in the case that the optical storage device is at a short seek control mode, the control mode switch is then at a predetermined mode, said tracking signal triggers the signal gain device for performing a gain operation to produce said tracking control signal, and the tracking control signal is further forwarded to the sled controller for generating said numerical control signal.

54. The control system of an optical storage device according to claim 53, wherein said frequency converter is a voltage frequency converter.

55. The control system of an optical storage device according to claim 53, wherein said tracking signal is a seek signal.

56. The control system of an optical storage device according to claim 43, wherein said signal controller of the optical storage device further includes thereof a central error controller and a speed profile controller; and in the case that the optical storage device is at a long seek control mode, said tracking signal is sent to the central error controller of said tracking actuator's controller for generating a tracking control signal for controlling a position of said lens, and the speed profile generator is used to receive a tracking number signal (TRKNUM) and a tracking direction signal (TRKDIR) for generating said numerical control signal.

57. The control system of an optical storage device according to claim 56, wherein said frequency converter is a velocity frequency converter.

58. The control system of an optical storage device according to claim 56, wherein said tracking signal is a central error signal (CE).

* * * * *